US012705948B2

(12) United States Patent
Fieglein et al.

(10) Patent No.: US 12,705,948 B2
(45) Date of Patent: Aug. 11, 2026

(54) ASSOCIATING IDENTIFICATION INFORMATION WITH VISUALLY CAPTURED INFORMATION

(71) Applicant: Wayne Fueling Systems LLC, Austin, TX (US)

(72) Inventors: Henry Fieglein, Leander, TX (US); Kalpit Singh, Jaipur (IN); Rohith Chinnaswamy, RoundRock, TX (US); Hob Hairston, Cedar Park, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 27 days.

(21) Appl. No.: 18/790,275

(22) Filed: Jul. 31, 2024

(65) Prior Publication Data

US 2025/0029442 A1 Jan. 23, 2025

Related U.S. Application Data

(63) Continuation of application No. 17/330,825, filed on May 26, 2021, now Pat. No. 12,087,121.

(Continued)

(51) Int. Cl.
*G07F 15/10* (2006.01)
*G06V 20/52* (2022.01)

(Continued)

(52) U.S. Cl.
CPC .............. *G07F 15/10* (2013.01); *G06V 20/52* (2022.01); *G06V 40/161* (2022.01);

(Continued)

(58) Field of Classification Search
CPC ....... G07F 15/10; G07F 15/001; G06V 20/52; G06V 40/161; G06V 20/625;

(Continued)

(56) References Cited

U.S. PATENT DOCUMENTS 6,732,081 B2 5/2004 Nicholson
7,382,244 B1 6/2008 Donovan et al.

(Continued)

FOREIGN PATENT DOCUMENTS

CN 105741560 A 7/2016
CN 107730898 A 2/2018

(Continued)

OTHER PUBLICATIONS

Extended European Search Report received for EP Application No. 21812804.9, mailed on Sep. 9, 2024, 16 pages.

(Continued)

*Primary Examiner* — An T Nguyen
(74) *Attorney, Agent, or Firm* — Mintz, Levin, Cohn, Ferris, Glovsky and Popeo, P.C.

(57) ABSTRACT

Systems, devices, and methods for associating vehicle identification information with other visually captured information are provided. In general, a system can include a processor configured to receive an image from a camera located at a fueling station. The processor can be configured to apply an algorithm to extract various features from the image, such as a vehicle that is present in the image, facial features of a driver and/or a passenger of the vehicle, or a license plate of the vehicle. The features can be used by the processor to determine information from the features, such as the identity of the driver, the make/model of the vehicle, or an owner of the vehicle. The processor can then, based on the determined information, be configured to take a variety of actions and thereby reduce the likelihood of possible future losses associated with the vehicles or individuals present in the image.

20 Claims, 2 Drawing Sheets

Related U.S. Application Data

(60) Provisional application No. 63/030,059, filed on May 26, 2020.

(51) Int. Cl.
*G06V 40/16* (2022.01)
*G07F 15/00* (2006.01)
*G08B 5/22* (2006.01)
*G08B 25/00* (2006.01)
*G06V 20/62* (2022.01)

(52) U.S. Cl.
CPC ............ *G07F 15/001* (2013.01); *G08B 5/22* (2013.01); *G08B 25/007* (2013.01); *G06V 20/625* (2022.01); *G06V 2201/08* (2022.01)

(58) Field of Classification Search
CPC ...... G06V 2201/08; G06V 40/16; G08B 5/22; G08B 25/007; G08B 13/19613; G08B 21/24; G08B 25/006; G08B 13/19602
See application file for complete search history.

(56) References Cited

U.S. PATENT DOCUMENTS

| | | | | |
|---|---|---|---|---|
| 8,890,655 | B2 | 11/2014 | Pederson | |
| 9,384,384 | B1 * | 7/2016 | Tyagi | G06T 11/60 |
| 12,087,121 | B2 | 9/2024 | Fieglein et al. | |
| 2012/0148117 | A1 | 6/2012 | Chang | |
| 2014/0270383 | A1 * | 9/2014 | Pederson | G08G 1/207 382/104 |
| 2015/0193947 | A1 * | 7/2015 | Sharma | G06T 7/0004 382/264 |
| 2016/0065903 | A1 | 3/2016 | Wang et al. | |
| 2016/0232765 | A1 | 8/2016 | Pederson | |
| 2017/0308965 | A1 | 10/2017 | Morris et al. | |
| 2018/0107891 | A1 | 4/2018 | Schmidt et al. | |
| 2019/0251365 | A1 * | 8/2019 | Salman | G06Q 20/18 |
| 2021/0304291 | A1 * | 9/2021 | Aggarwal | G06Q 30/0633 |
| 2021/0375087 | A1 | 12/2021 | Fieglein et al. | |
| 2023/0081918 | A1 | 3/2023 | Kandukuri et al. | |

FOREIGN PATENT DOCUMENTS

| | | | |
|---|---|---|---|
| CN | 107798510 | A | 3/2018 |
| CN | 109067745 | A | 12/2018 |
| CN | 109377238 | A | 2/2019 |
| CN | 109448143 | A | 3/2019 |
| EP | 4158608 | A1 | 4/2023 |
| JP | 2009245078 | A | 10/2009 |
| KR | 102039279 | B1 | 10/2019 |
| WO | 2006005953 | A2 | 1/2006 |
| WO | 2021242803 | A1 | 12/2021 |

OTHER PUBLICATIONS

International Search Report and Written Opinion received for PCT Application No. PCT/US2021/034151, mailed on Aug. 23, 2021, 10 pages.

Partial Supplementary European Search Report received for EP Application No. 21812804.9, mailed on May 31, 2024, 13 pages.

* cited by examiner

ASSOCIATING IDENTIFICATION INFORMATION WITH VISUALLY CAPTURED INFORMATION

CROSS-REFERENCE TO RELATED APPLICATIONS

This application is a continuation of U.S. application Ser. No. 17/330,825, filed May 26, 2021, and entitled "Associating Identification Information with Visually Captured Information," which claims priority under 35 U.S.C. § 119(e) to U.S. Provisional Patent Application No. 63/030,059 filed May 26, 2020, the entire contents of which are hereby expressly incorporated by reference herein.

FIELD

The present disclosure relates generally to associating identification information with visually captured information.

BACKGROUND

Various issues can occur at fueling stations that can result in various forms of loss. For example, a driver of a stolen car may pull into a fueling station for refuelling of the stolen car, an owner of a car may refuel their car with an incorrect type of fuel (e.g., by putting diesel fuel into a car designed to run on gasoline), or a would-be customer may fuel their car and drive away from a fuel dispenser at the fueling station without paying.

Today, identification of vehicles or individuals associated with these forms of loss can be achieved via the recognition of these vehicles/individuals by either other patrons of the fueling station or by attendants staffing the fueling station. As such, action to address the loss can only be taken after the loss has been is identified by the patrons/attendants and the appropriate response is discerned. If a long period of time passes between the occurrence of the loss and the taking of action to address the loss by the appropriate personnel, such as patrons, fueling station attendants, or members of law enforcement, the opportunity to prevent any further loss may be missed.

Accordingly, there remains a need for identification of vehicles and individuals.

SUMMARY

In general, systems and methods for associating identification information with visually captured information are provided.

In one aspect, a first data packet including image data acquired by a sensor that depicts at least one of an individual at a fueling station and a vehicle at the fueling station can be received by a server. The image data can be processed by the server to determine a feature of the at least one of the individual and the vehicle. The server can transmit a query to a remote database that can include the determined feature. A second data packet including identification information corresponding to the determined feature can be received by the server. An alert can be determined by the server based on the identification information. The server can provide the alert to an end user device.

One or more of the following features can be included in any feasible combination. The end user device can be a fueling station attendant terminal. The image data can include a depiction of at least a portion of the vehicle. The feature can include a make/model of the vehicle. The identification information can include at least one fuel type corresponding to the make/model of the vehicle. The end user device can be a fuel dispenser, and the alert can include an instruction to the fuel dispenser to enable only the at least one fuel type for dispensing at the fuel dispenser. The image data can include a depiction of a license plate of the vehicle. The feature can include a license plate number provided on the license plate. The image data can include a depiction of the individual. The feature can include a face of the individual. The identification information can include a name of the individual. The alert can comprise an indication of whether the individual is a drive-off suspect. The end user device can be a fuel dispenser, and the method can further include reducing a rate of fuel dispensation based on the indication. The method can further include transmitting the alert to a notification service. The image data can include a depiction of at least a portion of the vehicle, a depiction of a license plate of the vehicle, and a depiction of the individual. The feature can include a first determined feature including a make/model of the vehicle, a second determined feature including a license plate number provided on the license plate, and a third determined feature including a face of the individual. The identification information can include a name of a registered owner of the vehicle and a registered vehicle make/model associated with the second determined feature, the registered owner of the vehicle and the registered vehicle make/model provided at the remote database. The alert can include an indication of the presence or absence of a match between the first determined feature and the registered vehicle make/model associated with the second determined feature. The identification information can include a name of the customer and a name of a registered owner of the vehicle associated with the second determined feature, the registered owner of the vehicle provided at the remote database. The alert can include an indication of whether the name of the customer matches the name of a registered owner of the vehicle associated with the second determined feature. The fuel dispenser can include the sensor, and the server can be external to and separate from the fuel dispenser. The plurality of fuel dispensers can be located in a forecourt of the fueling station, and the image data can depict the forecourt of the fueling station. The sensor can be located at the fueling station, and the acquired image data is uniquely associated with one of a plurality of fuel dispensers at the fueling station.

In another aspect, a system is provided and can include a processor and memory storing instructions configured to cause the processor to perform operations herein. The operations can include analyzing a first data packet including image data acquired by a sensor to determine a feature of the image data, the image data depicting at least one of an individual at a fueling station and a vehicle at the fueling station, transmitting a query to a remote database, the query including the determined feature, determining an alert based on a second data packet received from the remote database, the second data packet including identification information corresponding to the determined feature, and providing the alert to an end user device.

One or more of the following features can be combined in any feasible combination. The system can further comprise the sensor. The fuel dispenser can include the sensor, a server can include the processor and the memory, and the server can be external to and separate from the fuel dispenser. A plurality of fuel dispensers can be located in a forecourt of the fueling station, and the image data can depict the forecourt of the fueling station. The sensor can be located at the fueling station, and the acquired image data can be uniquely associated with one of a plurality of fuel dispensers at the fueling station. The end user device can be a fueling station attendant terminal. The image data can include a depiction of at least a portion of the vehicle. The feature can include a make/model of the vehicle. The identification information can include at least one fuel type corresponding to the make/model of the vehicle. The end user device can be a fuel dispenser, and the alert can include an instruction to the fuel dispenser to enable only the at least one fuel type for dispensing at the fuel dispenser. The image data can include a depiction of a license plate of the vehicle. The feature can include a license plate number provided on the license plate. The image data can include a depiction of the individual. The feature can include a face of the individual. The identification information can include a name of the individual. The alert can comprise an indication of whether the individual is a drive-off suspect. The end user device can be a fuel dispenser, and the method can further include reducing a rate of fuel dispensation based on the indication. The method can further include transmitting the alert to a notification service. The image data can include a depiction of at least a portion of the vehicle, a depiction of a license plate of the vehicle, and a depiction of the individual. The feature can include a first determined feature including a make/model of the vehicle, a second determined feature including a license plate number provided on the license plate, and a third determined feature including a face of the individual. The identification information can include a name of a registered owner of the vehicle and a registered vehicle make/model associated with the second determined feature, the registered owner of the vehicle and the registered vehicle make/model provided at the remote database. The alert can include an indication of the presence or absence of a match between the first determined feature and the registered vehicle make/model associated with the second determined feature. The identification information can include a name of the customer and a name of a registered owner of the vehicle associated with the second determined feature, the registered owner of the vehicle provided at the remote database. The alert can include an indication of whether the name of the customer matches the name of a registered owner of the vehicle associated with the second determined feature.

In yet another aspect, non-transitory computer program products (i.e., physically embodied computer program products) are also described that store instructions, which when executed by one or more data processors of one or more computing systems, causes at least one data processor to perform the operations described herein.

One or more of the following features can be combined in any feasible combination. The system can further comprise the sensor. The fuel dispenser can include the sensor, a server can include the processor and the memory, and the server can be external to and separate from the fuel dispenser. A plurality of fuel dispensers can be located in a forecourt of the fueling station, and the image data can depict the forecourt of the fueling station. The sensor can be located at the fueling station, and the acquired image data can be uniquely associated with one of a plurality of fuel dispensers at the fueling station. The end user device can be a fueling station attendant terminal. The image data can include a depiction of at least a portion of the vehicle. The feature can include a make/model of the vehicle. The identification information can include at least one fuel type corresponding to the make/model of the vehicle. The end user device can be a fuel dispenser, and the alert can include an instruction to the fuel dispenser to enable only the at least one fuel type for dispensing at the fuel dispenser. The image data can include a depiction of a license plate of the vehicle. The feature can include a license plate number provided on the license plate. The image data can include a depiction of the individual. The feature can include a face of the individual. The identification information can include a name of the individual. The alert can comprise an indication of whether the individual is a drive-off suspect. The end user device can be a fuel dispenser, and the method can further include reducing a rate of fuel dispensation based on the indication. The method can further include transmitting the alert to a notification service. The image data can include a depiction of at least a portion of the vehicle, a depiction of a license plate of the vehicle, and a depiction of the individual. The feature can include a first determined feature including a make/model of the vehicle, a second determined feature including a license plate number provided on the license plate, and a third determined feature including a face of the individual. The identification information can include a name of a registered owner of the vehicle and a registered vehicle make/model associated with the second determined feature, the registered owner of the vehicle and the registered vehicle make/model provided at the remote database. The alert can include an indication of the presence or absence of a match between the first determined feature and the registered vehicle make/model associated with the second determined feature. The identification information can include a name of the customer and a name of a registered owner of the vehicle associated with the second determined feature, the registered owner of the vehicle provided at the remote database. The alert can include an indication of whether the name of the customer matches the name of a registered owner of the vehicle associated with the second determined feature.

DESCRIPTION OF DRAWINGS

This invention will be more fully understood from the following detailed description taken in conjunction with the accompanying drawings, in which.

DETAILED DESCRIPTION

Figure 1:
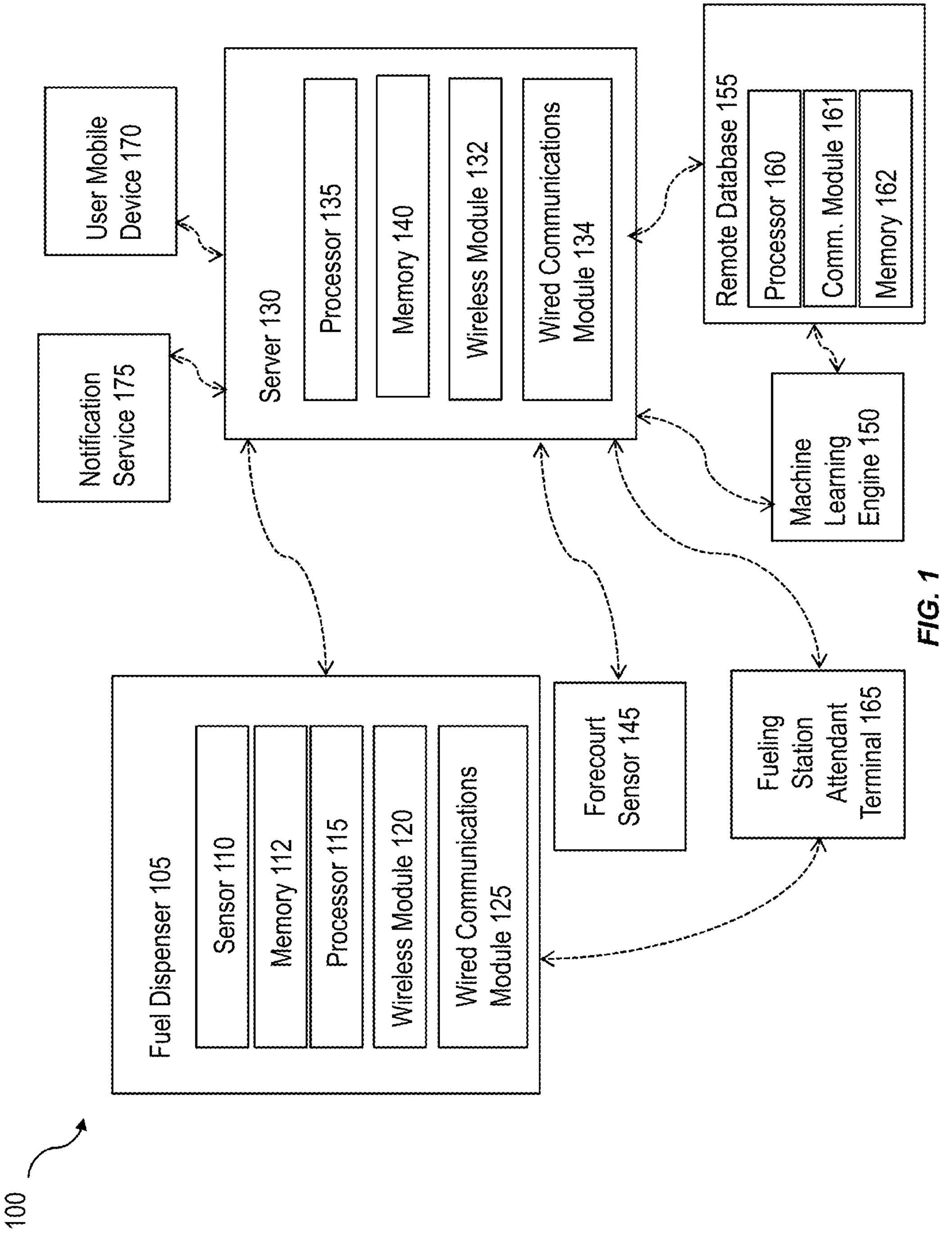
FIG. 1 is a schematic view illustrating components of one embodiment of a system for identifying vehicles and individuals with the use of visually captured information.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Systems, devices, and methods for associating vehicle identification information with other visually captured information are provided. In general, a system can include a camera located at a fueling station and a processor configured to receive an image from the camera. The processor is further configured to extract various features from the image, such as a vehicle (e.g., car, truck, motorcycle, bus, etc.) that is present in the image, facial features of an operator of the vehicle, and/or a license plate of the vehicle. The feature(s) can be used by the processor to determine information from the feature(s), such as an identity of a customer, a make/model of the vehicle, and/or an owner of the vehicle as listed on the vehicle's registration records that are accessible to the processor. The processor is also configured to, based on the determined information, take at least one action, such as interacting with a fuel dispenser at the fueling station to ensure that only fuels that are compatible with the make/model of vehicle in the image are available for selection by a user in a fueling transaction, contacting a fueling station attendant or law enforcement personnel if the customer is a person suspected of committing drive-offs in the past, and/or contacting law enforcement personnel if the registration information associated with the license plate does not match the make/model of the vehicle or corresponds to a vehicle that has been reported as stolen, thereby reducing the likelihood of possible future losses associated with the vehicles or individuals present in the image.

FIG. 1 is a system block diagram illustrating one embodiment of a system 100 for identifying vehicles and individuals with the use of visually captured information.

The system 100 includes a fuel dispenser 105. The fuel dispenser 105 includes a sensor 110, a memory 112, a processor 115, a wireless module 120, and a wired communications module 125. The sensor 110 can include a digital still or video camera configured to acquire images, although other optical sensors are possible. The sensor 110 is configured to acquire one or more images, for example, when a customer is detected in a field of view of the sensor 110. The sensor 110 can include one or more sensors. In an exemplary embodiment, the sensor 110 includes a plurality of sensors, which may help ensure that a clear image of an intended vehicle and/or individual target is acquired. The memory 112 can include executable instructions, which, when executed by the processor 115, perform operations. The processor 115, which can include one or more processors forming part of at least one computing system, can receive one or more images acquired by the sensor 110 and transmit the one or more images to either the wireless module 120 or the wired communications module 125. The sensor 110, the wireless module 120, and the communications module 125 can also be part of the at least one computing system. The wireless module 120 can include one or more wireless modules. The communications module 125 can include one or more wired communications modules.

The wireless module 120 and/or the wired communications module 125 are each configured to operatively connect the fuel dispenser 105 with a server 130 and to transmit the one or more images from the sensor 110 to the server 130. The server 130 includes a wireless module 132 and/or a wired communications module 134 configured to receive the one or more images transmitted from the wireless module 120 and/or the wired communications module 125, a processor 135 configured to execute commands on the one or more images, a memory 140 configured to store the received one or more images and any data related thereto. The memory 140 can include executable instructions, which, when executed by the processor 135, perform operations. The processor 135 can include one or more processors forming part of at least one computing system, and the memory 140 can include one or more memories forming part of the at least one computing system. The wireless module 132 and the wired communications 134 each have substantially the same functionalities and capabilities as the wireless module 120 and the wired communications module 125, respectively. The server 130 is external to and separate from the fuel dispenser 105, which may facilitate upgrading and/or replacement of the server 130, which is typically easier and/or less expensive to upgrade or replace than the fuel dispenser 105. In some implementations, the server 130 is located at the fueling station at which the fuel dispenser 105 is located. In some implementations, the server 130 can be located at an offsite location that is remote from the fueling station at which the fuel dispenser 105 is located.

In at least some implementations, the fueling station can include a plurality of fuel dispensers 105. Each of the plurality of fuel dispensers 105 can be in operable communication with the server 130, such that an image sensor 110 of each of the plurality of fuel dispensers 105 can transmit the one or more images acquired by the image sensor 110 to the server 130.

In some implementations, the processor 135 can be configured to receive one or more images acquired by a forecourt sensor 145. In other implementations, the processor 135 can be configured to transmit an instruction to the forecourt sensor 145 to acquire the one or more images. The forecourt sensor 145, which can include one or more sensors, can be oriented proximate a forecourt of the fueling environment such that at least a portion of the forecourt, in which the fuel dispenser 105 may be located, is within a field of view of the forecourt sensor 145. In the case of a fueling station having a plurality of fuel dispensers 105, the forecourt sensor 145 may be oriented such that a field of view of the forecourt sensor 145 is targeted to all of the fuel dispensers 105. In implementations in which the forecourt sensor 145 includes a plurality of sensors, each of the sensors can have a field of view targeted to all or to a partial number of the plurality of fuel dispensers 145. As with the sensor 110 of the fuel dispenser 105, the forecourt sensor 145 can include a digital still or video camera, although other optical sensors are possible. The forecourt sensor 145 can operate in conjunction with the sensor 110 (or sensors 110, in the case of a fueling station having a plurality of fuel dispensers 105) to acquire a comprehensive set of images of one or more individuals/customers and/or a vehicle at the fueling station, for processing by the processor 135, as explained in further detail below. The capturing of such a set of images provides a redundancy that helps ensure the system 100 captures clear, analyzable features for processing by the processor 135. The one or more images acquired by the sensor 110 (or sensors 110, in the case of a fueling station having a plurality of fuel dispensers 105) and/or the forecourt sensor 145 can be of an individual (e.g., can contain a visual representation of a customer) and/or a vehicle. The processor 135 of the server 130 is configured to utilize an image processing algorithm to determine, from the acquired one or more images, one or more image features related to the individual's face, the individual's body, and/or the vehicle. For example, a facial feature can include skin texture; relative position, size, and/or shape of the eyes, nose, cheekbones, and jaw; and the like. Examples of body features include height, weight, hair color, body shape, and the like. Examples of vehicle features include shape, color, license plate number, manufacturer/make/model decal, manufacturer hood ornament, and the like.

The image processing algorithm can also include a machine learning algorithm that can determine one or more of the aforementioned image features and, in some implementations, compare the determined one or more image features to those of a database of model image features stored in the memory 140 of the server 130 and associate the determined one or more image features with a user identity and/or a vehicle identity. For example, the machine learning algorithm can determine a manufacturer/make/model decal image feature from the acquired one or more image, and the determined manufacturer/make/model decal image feature can be compared with the database's model manufacturer/make/model image features, each of which are associated with a vehicle make/model, and thereby provide an identification of the vehicle.

In some implementations, the machine learning algorithm can identify a license plate number of a license plate attached to the vehicle, and the identified license plate number can be compared to data characterizing license plate numbers that is stored in the database. In some implementations, the machine learning algorithm can use one or more object detection models, such as a one-stage object detection model and/or a two-stage object detection model, to identify the license plate number. For example, in using a two-stage object detection model, the machine learning algorithm can first detect one or more regions in the acquired image(s) in which the license plate number may be present and classify the one or more regions based on whether a license plate number is present in the region. The machine learning algorithm can determine the license plate number contained within the one or more regions by analyzing the image data contained within the one or more regions for data characterizing the license plate number. For example, in using a one-stage object detection model, the machine learning algorithm can determine the license plate number without the aforementioned determination and classification of the one or more regions of the image. In using a one-stage object detection model, the machine learning algorithm can recognize objects, such as the aforementioned license plate number and other image features (including one or more of the image features described elsewhere herein), more precisely and quickly than other recognition systems and can simultaneously recognize multiple objects within the acquired one or more images.

Similarly, for another example, the machine learning algorithm can determine one or more facial features characterizing a face of an individual present in the one or more acquired images. For example, the machine learning algorithm can identify the one or more facial features present in a face of one or more individuals present in the one or more images, and the identified one or more facial features can be compared with those model facial features stored in the database to determine an identity of the one or more individuals. In some implementations, the identity of the one or more individuals can be determined by retrieving the biographical information stored in the database that is associated with the model facial features. The model facial features used by the machine learning algorithm can include facial landmarks, which are a set of points and/or features on a face that are used, in part or in full, to identify the customer presented in an image. Examples of facial landmarks include a left eyebrow inner point, a right eyebrow inner point, a left eyebrow outer point, a right eyebrow outer point, a left eye pupil, a right eye pupil, a left eye top portion, a right eye top portion, a left eye bottom portion, a right eye bottom portion, a left eye inner portion, a right eye inner portion, a left eye outer portion, a right eye outer portion, a nose tip, a left nose root, a right nose root, a top portion of a left alar, a top portion of a right alar, an outer tip portion of a left alar, an outer tip portion of a right alar, a left top portion of an upper lip, a right top portion of an upper lip, a left bottom portion of an upper lip, a right bottom portion of an upper lip, a top left portion of a lower lip, a top right portion of a lower lip, a bottom left portion of a lower lip, a bottom right portion of a lower lip, a left portion of a mouth, and a right portion of a mouth.

In some implementations, the machine learning algorithm can determine a pose of the face and/or the head of the one or more individuals. For example, the machine learning algorithm can analyze an image to detect a presence of a face of the one or more individuals in the image, extract a frame of the face from the image based on the detected facial presence, and utilize a facial landmark detector to identify key regions of the face for use in estimating a pose of the face relative to the head of the individual.

The machine learning algorithm can also process the determined image features to make secondary determinations of the one or more individuals depicted in the images received from sensor 110 and/or forecourt sensor 145 to provide additional information for use in identifying the one or more individuals depicted in the images. For example, the machine learning algorithm can estimate an age of the one or more individuals by determining an average age of other individuals having similar model facial features and assigning the determined average age when the similarity of the facial features of the one or more individuals depicted in images to the model features of the other individuals of an average age exceeds a predetermined threshold. The machine learning algorithm can also estimate a degree of blurriness of the face in the image and discard the image from the algorithm's analysis if the degree of blurriness exceeds a predetermined threshold. For example, the machine learning algorithm can use a classifier to identify whether an image is blurry, and the classifier can be trained, via use of a set of blurred images, such that the classifier can identify blurriness in an image based on a degree of confidence of blurriness determined by the classifier. If the classifier determines that blurriness is present in an image, and the determined degree of confidence of blurriness exceeds a predetermined threshold degree of confidence of blurriness, the machine learning algorithm can discard the image based on the blurriness and discount it from the various image analyses described elsewhere herein.

The machine learning algorithm can also analyze the images for facial feature patterns consistent with various experienced emotions, such as happiness, sadness, neutral, anger, contempt, disgust, surprise, fear, and the like, and determine a degree of likelihood that one or more of the emotions is being experienced by the one or more individuals depicted in the image. For example, the machine learning algorithm can detect a presence of a face of the one or more individuals in the image and, based on the analysis of the facial feature patterns present in the face, determine emotion predictions that characterize a probability of the individual associated with the face experiencing one or more of the aforementioned emotions. The machine learning algorithm can be trained to classify the analyzed facial feature patterns as being associated with, or otherwise indicative of, the one or more emotions described above by using data sets characterizing associations between facial feature patterns and the one or more emotions. In some implementations, the algorithm can provide an indication that the one or more emotions are being experienced by the one or more individuals depicted in the image when the determined degree of likelihood surpasses a predetermined threshold. The machine learning algorithm can also determine a degree of exposure of an individual's face, an amount of facial hair and a length of the facial hair relative to the individual's face, an estimated gender of the individual based on the determined image features, whether the individual is wearing glasses or makeup, whether there are objects present blocking parts of the face, whether the individual is smiling, a type of hair of the individual, and an orientation of the face of the individual.

In some implementations, the machine learning algorithm can be iteratively updated or trained to improve the accuracy of the determination of the one or more image features. The machine learning algorithm can be updated or trained by a machine learning engine 150 that is in operable communication with the server 130. As shown, the machine learning engine 150 is a separate component, remote from the server 130, that can be in operable communication with the server 130. However, in some implementations, the machine learning engine 150 can be a component of the server 130. The model image features can be transferred to the memory 140 by the machine learning engine 150 and stored therein. The model image features can be actively updated by the machine learning engine 150 to improve the comparison accuracy of the machine learning algorithm. For example, in some implementations, the machine learning algorithm can be trained with one or more data sets characterizing image features that correspond to vehicles of a particular manufacturer and/or models of that manufacturer. For example, in some implementations, the machine learning algorithm can be trained with one or more data sets characterizing image features that correspond to the aforementioned facial features and/or facial feature patterns to determine facial features for use in individual identification as described elsewhere herein. In some implementations, the machine learning engine 150 can push the aforementioned data sets and/or model image features for use in training/configuring the machine learning algorithm to the server 130 such that the machine learning algorithm can be updated/trained and executed on the server 130. In some implementations, the server 130 can query the machine learning engine 150 for the data sets and/or model image features.

The machine learning engine 150 can also receive, from the server 130, the one or more images acquired by the sensor 110 and/or the forecourt sensor 145 for use in improving the training capabilities of the machine learning engine 150. For example, in some implementations, one or more images of a registered customer containing the facial features of the registered customer can be provided by the machine learning engine 150 to the memory 140 of the server 130. The processor 135 can access the one or more images and extract the facial landmarks from the facial features in the one or more images and create a record, for storage in the memory 140 of the server 130 or on a remote server operatively coupled to the server 130, that contains the facial landmarks. The one or more images can also be provided to the memory 140 with associated data characterizing the biographical information of the registered customer, which can be added to the record by the processor 135. In some implementations, multiple images, each of which can depict one or more of the facial landmarks of the registered customer from a variety of angles/perspectives and in a variety of light levels, can be provided. Each of the different views of the facial landmarks can be added to the record and thereby provide a more robust collection of facial landmarks of the registered customer for use by the machine learning algorithm in identifying the registered customer in images acquired by the sensor 110 and/or the forecourt sensor 145.

Executing the image processing algorithm can include the processor 135 generating a query containing the determined image features and any identity information determined by the machine learning algorithm characterizing an identity of the individual/customer present in the image, and the server 130 transmitting the query to a remote database 155 that can provide identification information associated with a known customer or vehicle identity to the server 130 in response to the query. The remote database 155 can include such forms of information as vehicle registration records, a list of names associated with facial features that can be determined from the image, a list of drive-off suspects, and/or a list of vehicle makes/models together with their associated compatible fuel types, and the like. In some implementations, the remote database 155 can include one or more databases forming part of at least one computer system that include some or all of the above-identified forms of information. As shown in FIG. 1, the remote database 155 is in operable communication with the machine learning engine 150, and can provide the identification information to the machine learning engine 150 for use in training the machine learning algorithm in the identification of features. In some implementations, a configuration of the remote database 155 can be pushed to the server 130 for use by the machine learning algorithm in determining one or more of the aforementioned identifications/identities. In some implementations, the server 130 can query the remote database 155 using the one or more of the data sets determined by the machine learning algorithm, as described above, for information used to determine one or more of the aforementioned identifications/identities.

The query can include the previously determined image features and the identity information determined by the machine learning algorithm, and the query can be provided, via the wireless module 132 and/or the wired communications module 134, to a processor 160 of the remote database 155, via a communications module 161 of the remote database 155, which can in turn use the query and identity information in a search of the information stored in a memory 162 of the remote database 155 to find records in the remote database 155 that match or otherwise correspond to the determined features. The memory 162 can include executable instructions, which, when executed by the processor 162, perform operations. The processor 160 can include one or more processors. For example, where the query includes such identity information as a make/model of a vehicle present in the image, the processor 160 can search the list of vehicle makes/models in the database 155 to find a listing of compatible fuel types for the make/model of the vehicle. As another example, where the query includes such determined image features as a license plate number, the processor 160 can search the vehicle registration records in the database 155 to find records that include the license plate number. In yet another example, where the query includes such facial features of the one or more individuals as determined from the image, the query can search the list of names in the database 155, and various facial features associated therewith (e.g., as found in a driver's license photo or other photo associated with, e.g., government-issued identification), to find records that have facial features that match those in the face of the one or more individuals.

The processor 160 can compile the data found in the remote database 155 that is responsive to the query into at least one data packet containing identification information. For example, the identification information can include a name of a registered owner of the vehicle and a registered vehicle/make model associated with the license plate number determined from the image data, a name of a customer determined from the facial features provided as part of the query, a registered owner of the vehicle associated with the license plate number determined from the image data, and/or at least one fuel type or grade (e.g., minimum acceptable octane level) corresponding to the make/model of the vehicle determined from the image data.

The remote database 155 can transmit the data packet to the processor 135 of the server 130, which can determine an alert based on the identification information present in the at least one data packet. The alert can be, for example, an indication of the presence or absence of a match between the make/model of the vehicle determined from the image data and a registered vehicle make/model associated with the license plate number determined from the image data and as found in the remote database, an indication of whether the name of the customer, as found in the remote database and in response to the query including the face of the customer, matches the name of a registered owner of the vehicle associated with the license plate number determined from the image data, an indication of whether the name of the customer corresponds to that of a known drive-off suspect, and/or an instruction to enable for dispensing only the fuel types that are compatible with the make/model of the vehicle determined from the image data.

The alert can be transmitted to one or more end user devices for further action via the communication module 161. The end user device can be, for example, a fueling station attendant terminal 165 that is configured to manage operation of the fuel dispenser 105 and to be used by a fuel station attendant, e.g., an employee in a store at the fueling station. The fueling station attendant terminal 165 can be configured to display information contained in the alert and to receive inputs from the user, e.g., the fuel station attendant, based on the displayed information, such as an instruction to reduce the rate of fuel dispensation that can be communicated to the fuel dispenser 105, or to contact law enforcement personnel, if the alert indicates that the customer has a name matching that of a known drive-off suspect, if the alert indicates that the license plate number on the vehicle, as determined from the image data, does not match the make/model of the vehicle of the registration record associated with the license plate number, or if the license plate number on the vehicle corresponds to a vehicle that has been reported as stolen.

As another example, the end user device can be an application on a user mobile device 170, e.g., a mobile phone, an electronic tablet, etc., of a vehicle owner or a fueling station attendant, that is also configured to display information contained in the alert and to receive inputs similar to those described above from the user based on the displayed information. In some implementations, the providing of the alert to the end user device can occur via an internet connection, Bluetooth, Wifi, a local area network (LAN), or the like.

As yet another example, the end user device can be the fuel dispenser 105, and the alert can include an instruction to the fuel dispenser 105 to enable or disable certain functionality based on the identification information, such as the disabling of fuel types/grades that are not compatible with the vehicle make/model determined by the processor 135 from the image recorded by the sensor 110 and/or the forecourt sensor 145. In yet another example, the alert can also include an instruction to the fuel dispenser 105 to automatically reduce the rate of fuel dispensation without any feedback or input from the fuel station attendant.

In some implementations, the alert can be transmitted to a notification service 175 without requiring any input from any end user devices such as the fueling station attendant terminal 165, the user mobile device 170, and/or or the fuel dispenser 105. The notification service 175 can be an electronic system that can forward the alert to various recipients. For example, the notification service 175 can be in operable communication with law enforcement personnel and can further transmit the alert to the law enforcement personnel for further action. In another example, the notification service 175 can also be in operable communication with an owner of the fueling station and can further transmit the alert to the owner. In some embodiments, the notification service 175 can be integrated into the server 130. However, in other embodiments, the notification service 175 can be a remote component, separate from the server 130.

In some implementations, wherein the machine learning algorithm determines image features from the images received from sensor 110 and/or forecourt sensor 145, but is not able to associate the determined image features with identity information present at the server 150, the machine learning engine 150 can access the identification information present in the at least one data packet and create a record that associates the identification information with the determined image features. This association can be used by the machine learning engine 150 for future training of the machine learning algorithm.

Figure 2:
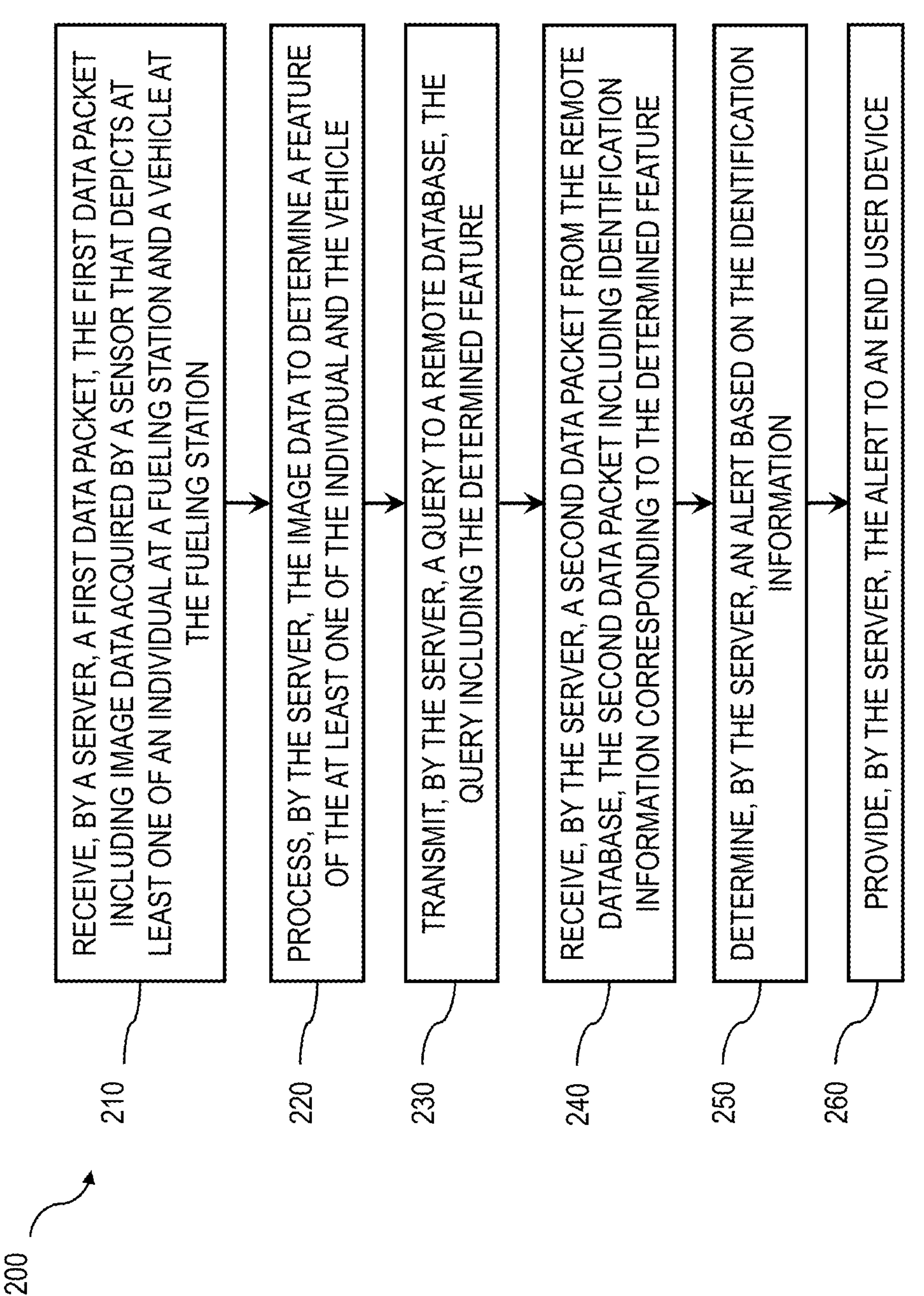
FIG. 2 is a process flow diagram illustrating one embodiment of automated identification of vehicles and individuals with the use of visually captured information.

FIG. 2 illustrates one embodiment of a method 200 of at least some implementations of the current subject matter that can provide for automated identification of vehicles and individuals with the use of visually captured information. The method 200 is described with respect to the system 100 of FIG. 1, but other embodiments of systems can be similarly used.

In the method 200, a first data packet including image data acquired by the sensor 110 and/or the forecourt sensor 145 is received 210 by the server 130 from the fuel dispenser 105 via the wireless module 120 and/or the wired module 125 (for sensor 110 gathered data) and/or the forecourt sensor 145. The image data is processed by the processor 135 of the server 130 using the image processing algorithm described above to determine 120 one or more image features. The processor 135 generates a query containing the determined image features, which are transmitted 230 by the server 130, via the wireless module 132 and/or the wired communications module 134 to the processor 160 of the remote database 155. The processor 160, in turn, uses the query in a search of the information stored in the remote database 155 to find records in the remote database 155 that match or otherwise correspond to the determined image features. The processor 160 compiles the data found in the remote database 155 that is responsive to the query into a second data packet containing identification information, which is transmitted from the remote database 155 and received 240 by the server 130. The processor 135 of the server 130 determines 250 an alert based on the identification information in the second data packet. The alert is provided 260 by the server 130 to at least one end user device, such as the fueling station attendant terminal 165, the user mobile device 170, the notification service 175, and/or the fuel dispenser 105.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:

receiving, by a server, first data characterizing image data comprising facial features of an individual at a fueling station and a vehicle at the fueling station operated by the individual;

executing, by the server, an image processing algorithm to process the first data, which when executed determines a facial feature of the individual and a license plate of the vehicle in the first data and compares the determined facial feature and the determined license plate with model data stored in a memory of the server and characterizing model facial features and model license plates, wherein the image processing algorithm is trained in a machine learning process to receive training image data comprising a plurality of records of individuals, each record including image data depicting facial features of the individuals from a plurality of angles and in a plurality of light levels and generate identifying features of individuals and vehicles based on the training image data;

transmitting, by the server, a query to a remote database, the query including the facial feature of the individual and the license plate of the vehicle determined based on the comparing, the remote database including individual names associated with facial features and vehicle registration records;

receiving, by the server from the remote database, second data comprising identification information corresponding to the facial feature of the individual and the license plate of the vehicle;

determining, by the server, an alert based on the identification information; and providing, by the server, the alert to an end user device.

2. The method of claim 1, wherein the first data is acquired via an image sensor positioned in a forecourt of the fueling station.

3. The method of claim 1, wherein the identification information comprises a make/model of the vehicle.

4. The method of claim 3, wherein the identification information comprises at least one fuel type corresponding to the make/model of the vehicle.

5. The method of claim 4, wherein the end user device is a fuel dispenser, and the alert comprises an executable instruction configured to cause the fuel dispenser to enable only the at least one fuel type for dispensing at the fuel dispenser.

6. The method of claim 4, wherein the end user device is a fuel dispenser, and the alert comprises an executable instruction configured to cause the fuel dispenser to reduce a rate of fuel dispensation.

7. The method of claim 1, wherein the image processing algorithm is further configured to determine an emotion of the individual based on the first data, the emotion determined with respect to a predetermined threshold associated with a degree of likelihood the individual is experiencing the emotion, and to provide an indication that the individual is experiencing the emotion based on the prediction exceeding the predetermined threshold.

8. The method of claim 1, wherein the alert comprises an indication that the license plate of the vehicle corresponds to a license plate of a stolen vehicle.

9. The method of claim 1, wherein a configuration of the remote database is provided on the server and the identification information corresponding to the facial feature of the individual and the license plate of the vehicle is determined based on the configuration of the remote database provided on the server.

10. The method of claim 1, further comprising determining a degree of blurriness of the image data, determining the degree of blurriness of the image data exceeds a predetermined confidence threshold, and discarding the image data from the first data based on the degree of blurriness of the image data exceeding the predetermined confidence threshold.

11. A system, comprising:

a processor; and a memory storing instructions configured to cause the processor to perform operations comprising:

receiving first data characterizing image data comprising facial features of an individual at a fueling station and a vehicle at a fueling station operated by the individual;

executing, based on the first data, an image processing algorithm to process the first data, which when executed determines a facial feature of the individual and a license plate of the vehicle in the first data and compares the determined facial feature and the determined license plate with model data stored in a memory of the server and characterizing model facial features and model license plates, wherein the image processing algorithm is trained in a machine learning process to receive training image data comprising a plurality of records of individuals, each record including image data depicting facial features of the individuals from a plurality of angles and in a plurality of light levels and generate identifying features of individuals and vehicles based on the training image data;

transmitting a query to a remote database, the query including the determined facial feature of the individual and the license plate of the vehicle determined based on the comparing, the remote database including individual names associated with facial features and vehicle registration records;

receiving, from the remote database, second data comprising identification information corresponding to the determined facial feature of the individual and the license plate of the vehicle;

determining an alert based on the identification information; and providing the alert to an end user device.

12. The system of claim 11, wherein the first data is acquired via an image sensor positioned in a forecourt of the fueling station.

13. The system of claim 11, wherein the identification information comprises a make/model of the vehicle.

14. The system of claim 13, wherein the identification information comprises at least one fuel type corresponding to the make/model of the vehicle.

15. The system of claim 14, wherein the end user device is a fuel dispenser, and the alert comprises an executable instruction configured to cause the fuel dispenser to enable only the at least one fuel type for dispensing at the fuel dispenser.

16. The system of claim 14 wherein the end user device is a fuel dispenser, and the alert comprises an executable instruction configured to cause the fuel dispenser to reduce a rate of fuel dispensation.

17. The system of claim 11, wherein the image processing algorithm is further configured to determine an emotion of the individual based on the first data, the emotion determined with respect to a predetermined threshold associated with a degree of likelihood the individual is experiencing the emotion, and to provide an indication that the individual is experiencing the emotion based on the prediction exceeding the predetermined threshold.

18. The system of claim 11, wherein the alert comprises an indication that the license plate of the vehicle corresponds to a license plate of a stolen vehicle.

19. The system of claim 11, wherein a configuration of the remote database is stored within the memory and the identification information corresponding to the facial feature of the individual and the license plate of the vehicle is determined based on the configuration of the remote database stored within the memory.

20. The system of claim 11, further comprising determining a degree of blurriness of the image data, determining the degree of blurriness of the image data exceeds a predetermined confidence threshold, and discarding the image data from the first data based on the degree of blurriness of the image data exceeding the predetermined confidence threshold.

* * * * *